(12) United States Patent
Allen et al.

(10) Patent No.: US 9,710,522 B2
(45) Date of Patent: *Jul. 18, 2017

(54) HANDLING INFORMATION SOURCE INGESTION IN A QUESTION ANSWERING SYSTEM

(71) Applicant: International Business Machines Corporation, Armonk, NY (US)

(72) Inventors: Corville O. Allen, Morrisville, NC (US); Daniel M. Jamrog, Acton, MA (US); Kristin A. Witherspoon, Somersville, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/157,440

(22) Filed: May 18, 2016

(65) Prior Publication Data

US 2016/0259793 A1   Sep. 8, 2016

Related U.S. Application Data

(63) Continuation of application No. 14/458,435, filed on Aug. 13, 2014.

(51) Int. Cl.
   *G06F 17/30* (2006.01)

(52) U.S. Cl.
   CPC ...... *G06F 17/3053* (2013.01); *G06F 17/3043* (2013.01); *G06F 17/30528* (2013.01); *G06F 17/30554* (2013.01); *G06F 17/30867* (2013.01); *G06F 17/30873* (2013.01)

(58) Field of Classification Search
   CPC ............. G06F 17/3043; G06F 17/3051; G06F 17/3053; G06F 17/30864
   See application file for complete search history.

(56) References Cited

U.S. PATENT DOCUMENTS

| 7,587,387 | B2 | 9/2009 | Hogue |
| 8,185,355 | B2 | 5/2012 | Nath et al. |
| 8,255,390 | B2 | 8/2012 | Inagaki et al. |
| 8,549,014 | B2 | 10/2013 | Acharya et al. |
| 8,601,030 | B2 | 12/2013 | Bagchi et al. |
| 8,893,276 | B2 | 11/2014 | Sutherland et al. |

(Continued)

OTHER PUBLICATIONS

Dakka, W. et al, "Answering General Time-Sensitive Queries," IEEE Transactions on Knowledge and Data Engineering, Feb. 2012, vol. 24, No. 2, pp. 220-235, IEEE Computer Society.

(Continued)

*Primary Examiner* — Augustine K Obisesan
*Assistant Examiner* — Lahcen Ennaji
(74) *Attorney, Agent, or Firm* — Nicholas D. Bowman

(57) ABSTRACT

A question-answering (QA) system first receives input questions. Each question is then assigned to a first question category of a plurality of question categories. The QA system then identifies a set of candidate answers to each question using a core information source. A set of confidence scores, including a confidence score for each candidate answer, is then calculated. The QA system then determines that the first set of confidence scores fails to satisfy confidence criteria. In response to this determination, an updated information source is ingested.

5 Claims, 6 Drawing Sheets

(56) References Cited

U.S. PATENT DOCUMENTS

| | | | |
|---|---|---|---|
| 9,043,887 B2 | 5/2015 | McLachlan et al. | |
| 9,396,268 B2 | 7/2016 | Effrat et al. | |
| 9,396,730 B2 | 7/2016 | Karpey et al. | |
| 2005/0010553 A1* | 1/2005 | Liu | G06F 17/30265 |
| 2006/0173762 A1* | 8/2006 | Clater | G06Q 10/06 |
| | | | 705/35 |
| 2007/0196804 A1* | 8/2007 | Yoshimura | G09B 7/02 |
| | | | 434/323 |
| 2009/0043749 A1 | 2/2009 | Garg et al. | |
| 2009/0287678 A1* | 11/2009 | Brown | G06F 17/30654 |
| 2012/0077178 A1 | 3/2012 | Bagchi et al. | |
| 2012/0301864 A1* | 11/2012 | Bagchi | G09B 7/02 |
| | | | 434/362 |
| 2013/0132308 A1* | 5/2013 | Boss | G06F 17/30976 |
| | | | 706/12 |
| 2013/0304730 A1 | 11/2013 | Zhou | |
| 2015/0347569 A1 | 12/2015 | Allen et al. | |
| 2015/0347587 A1 | 12/2015 | Allen et al. | |
| 2016/0048514 A1 | 2/2016 | Allen et al. | |

OTHER PUBLICATIONS

Kumar, V., "Effective Information Search and Retrieval for Answering Time Sensitive Queries," International Journal of Computer Technology and Applications, Nov.-Dec. 2013, Vo. 4 (6), pp. 951-955, ISSN: 2229-6093.

Leela, R. et al., "Context Aware Time-Sensitive Queries," IJDCST, @Dec. Issue, V-1, 1-8, SW-1, 9 pages, ISSN: 2320-7884, www.ijdcst.com.

IBM, "List of IBM Patents or Patent Applications Treated as Related", May 16, 2016, 2 pages.

* cited by examiner

HANDLING INFORMATION SOURCE INGESTION IN A QUESTION ANSWERING SYSTEM

BACKGROUND

The present disclosure relates to computer systems, and more specifically, to question answering (QA) systems.

Recent research has been directed to developing question answering (QA) systems designed to receive input questions, analyze them, and return applicable answers. These systems may rely on natural language processing, automated reasoning, machine learning, and other advanced techniques. Using these techniques, QA systems may provide mechanisms for searching large sources of content and analyzing the content with regard to a given input question in order to determine an answer to the question. In some QA systems this may take the form of hypothesis generation, scoring, and ranking in order to determine a final set of one or more output answers.

SUMMARY

According to embodiments of the present disclosure, aspects of the disclosure may include a method, a system, and a computer program product for handling a plurality of input questions. The plurality of input questions may first be received. Each question of the plurality of input questions may then be assigned to a first question category of a plurality of question categories. A set of candidate answers to each input question may be identified using a core information source. A first set of confidence scores may be calculated. This first set of confidence scores may include a confidence score for each candidate answer. A determination may then be made that the first set of confidence scores fails to satisfy confidence criteria. In response to this determination, an updated information source may be ingested.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

Figure 1:
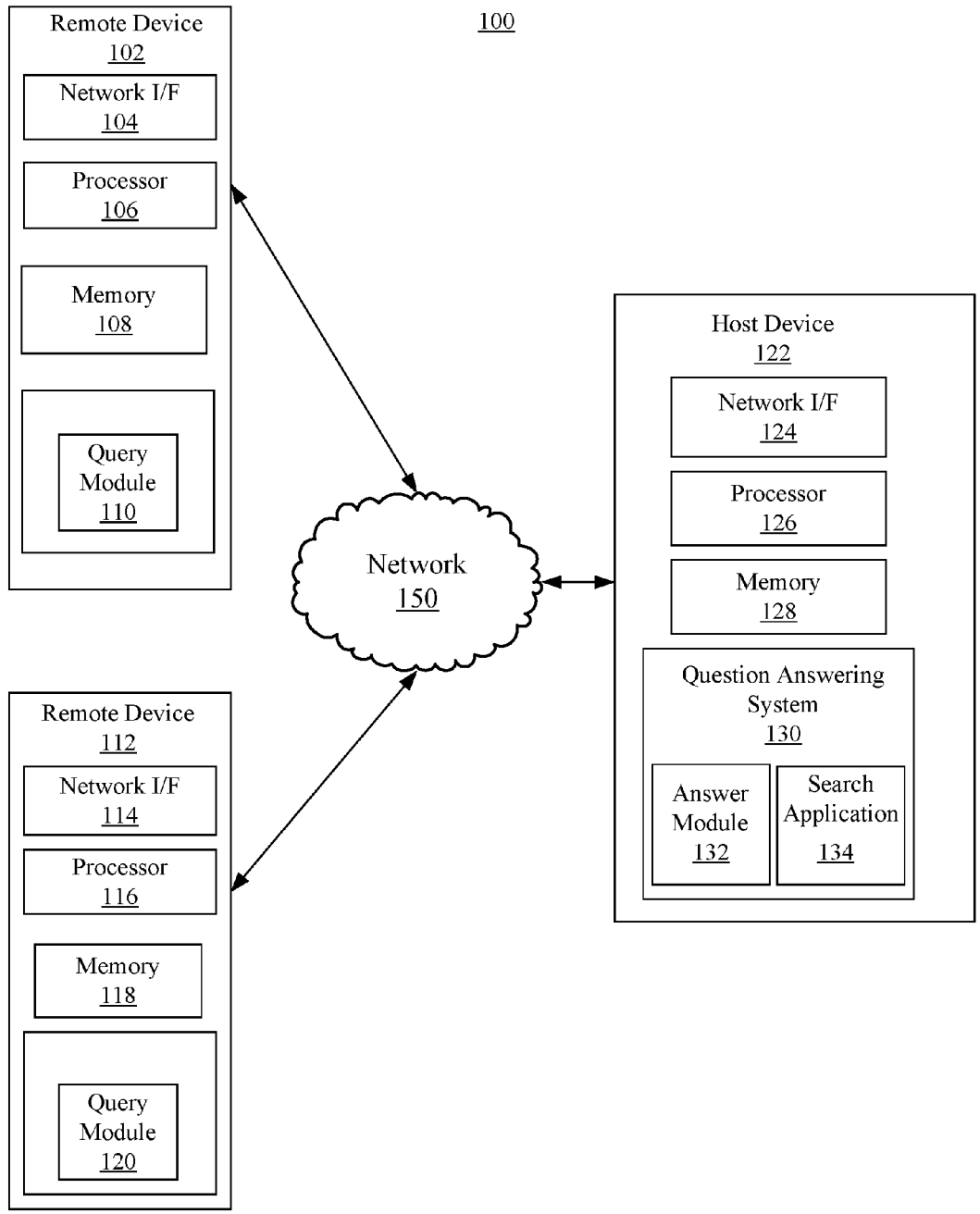
FIG. 1 illustrates a block diagram of an example computing environment for use with a question answering (QA) system, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to question answering (QA) systems. While the present disclosure is not necessarily limited to such applications, various aspects of the disclosure may be appreciated through a discussion of various examples using this context. Furthermore, it is contemplated that some embodiments may use or take the form of computer systems that may not be question answering systems.

While a QA system is operational, it may be difficult to determine when and in what ways the information source currently used by the QA system (i.e., the core information source) is no longer adequate for use in identifying candidate answers to input questions. Users may continue to ask questions, and they may begin to receive candidate answers that are inaccurate, based on outdated information, or associated with low levels of confidence (i.e., low confidence scores). In some situations, any given user may not be in a good position to assess whether a string of one or more inadequate candidate answers that he has received is a sign that a new information source is needed. This may occur due to small sample sizes, for example, in situations where there are many users of a QA system and each user only asks a small portion of the total questions that the system receives.

In addition, this problem may be further compounded in situations where many different kinds of questions are input into a single QA system. In such cases, the core information source may be very good for identifying answers to certain kinds of questions, but may be bad at identifying answers to other kinds of questions. Without having a methodical analysis of the system's operations, however, it may be difficult for a given user to pinpoint the areas where the core information source is lacking strength. Beyond that, without knowing the kinds of questions that the QA system answers poorly, it may be difficult to know whether any of multiple potential new information sources on differing topics are worth ingesting.

In some embodiments, the present invention may include analyzing input questions as they are received by a QA system and, based on the analysis, assigning each input question to an appropriate question category. Then the QA system may be able to determine whether its core information source is adequate on a category-by-category basis by performing audits on selected categories. During these audits, the confidence scores and user feedback for questions assigned to a selected category may be compiled, analyzed, and compared to a set of confidence criteria. If all or some of the confidence criteria are not satisfied, then the QA system may determine that ingesting a new information source (i.e., updated information source) is needed in order to address the deficiency in answers to questions assigned to that selected category.

In some embodiments, once the determination is made that a new information source is needed, ingesting a new information source and training the QA system on the new information source may involve a number of steps. These steps may be performed gradually and while the QA system is still operational (i.e., still actively answering incoming questions). A potential new information source may be targeted for ingestion by the QA system based on the information source's association with the question category that triggered the need for the audit. Upon ingestion, the QA system may be trained on the new information source through a series of training questions. Once certain training criteria are met, the new information source may be added to the core information source and used as part of the regular question answering process.

As discussed above, aspects of the disclosure may relate to QA systems. Accordingly, an understanding of the embodiments of the present invention may be aided by describing embodiments of these QA systems and the environments in which these systems may operate. Turning now to the figures, FIG. 1 is a block diagram of an example computing environment 100 for use with a question answering system, consistent with embodiments of the present disclosure. In some embodiments, the computing environment 100 may include one or more remote devices 102, 112 and one or more host devices 122. Remote devices 102, 112 and host device 122 may be distant from each other and communicate over a network 150 in which the host device 122 comprises a central hub from which remote devices 102, 112 can establish a communication connection. Alternatively, the host device and remote devices may be configured in any other suitable relationship (e.g., in a peer-to-peer or other relationship).

In some embodiments, the network 150 can be implemented by any number of any suitable communications media (e.g., wide area network (WAN), local area network (LAN), Internet, Intranet, etc.). Alternatively, remote devices 102, 112 and host devices 122 may be local to each other, and communicate via any appropriate local communication medium (e.g., local area network (LAN), hardwire, wireless link, Intranet, etc.). In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers, hundreds or thousands of them or more, disposed within one or more data centers and configured to share resources over the network 150.

In some embodiments, host device 122 may include a question answering system 130 having a search application 134 and an answer module 132. The search application may be implemented by a conventional or other search engine, and may be distributed across multiple computer systems. The search application 134 may be configured to search one or more databases or other computer systems for content that is related to a question input by a user at a remote device 102, 112.

In some embodiments, remote devices 102, 112 may enable users to submit questions (e.g., search requests or other user queries) to host devices 122 to retrieve search results. For example, the remote devices 102, 112 may include a query module 110, 120 (e.g., in the form of a web browser or any other suitable software module) and present a graphical user interface or other interface (e.g., command line prompts, menu screens, etc.) to solicit queries from users for submission to one or more host devices 122 and to display answers/results obtained from the host devices 122 in relation to such user queries.

Consistent with various embodiments, host device 122 and remote devices 102, 112 may be computer systems, and may each be equipped with a display or monitor. The computer systems may include at least one processor 106, 116, 126; memories 108, 118, 128; internal or external network interface or communications devices 104, 114, 124 (e.g., modem, network cards, etc.); optional input devices (e.g., a keyboard, mouse, or other input device); and any commercially available or custom software (e.g., browser software, communications software, server software, natural language processing software, search engine and/or web crawling software, filter modules for filtering content based upon predefined criteria, etc.). In some embodiments, the computer systems may include servers, desktops, laptops, and hand-held devices. In addition, the answer module 132 may include one or more modules or units to perform the various functions of embodiments as described below (e.g., receiving an input question, assigning the input question to a question category, determining a set of candidate answers, comparing confidence scores and user feedback to confidence criteria, etc.), and may be implemented by any combination of any quantity of software and/or hardware modules or units.

Figure 2:
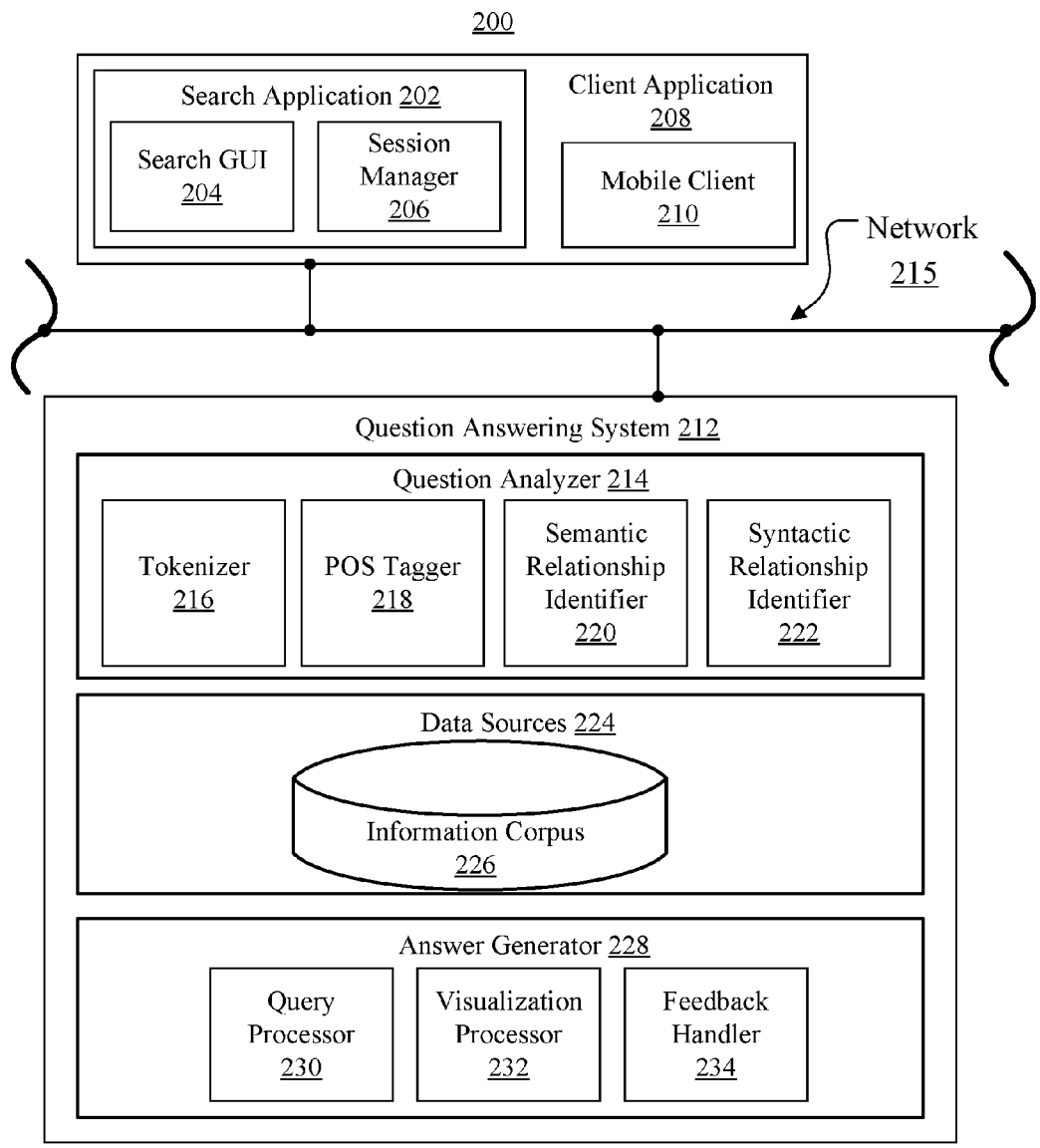
FIG. 2 illustrates a block diagram of an example QA system usable to generate answers to one or more input questions, consistent with embodiments of the present disclosure.

Turning now to FIG. 2, illustrated is a block diagram of an example question answering system usable to generate answers to one or more input questions, consistent with embodiments of the present disclosure. Aspects of FIG. 2 are directed toward an exemplary system architecture 200, including a question answering system 212 to generate answers to user queries (e.g., input questions). In some embodiments, one or more users can send requests for information to QA system 212 using a remote device (such as remote devices 102, 112 of FIG. 1). Such a remote device may include a client application 208 which may itself involve one or more entities operable to generate information that is then dispatched to QA system 212 via network 215. QA system 212 may be able to perform methods and techniques for responding to the requests sent by the client application 208. In some embodiments, the information received at QA system 212 may correspond to input questions received from users, where the input questions may be expressed in a free form and in natural language.

A question (similarly referred to herein as a user query) may be one or more words that form a search term or request for data, information, or knowledge. A question may be expressed in the form of one or more keywords. Questions may include various selection criteria and search terms. A question may be composed of complex linguistic features in addition to keywords. However, a keyword-based search for answers may also be possible. In some embodiments, using restricted syntax for questions posed by users may be enabled. The use of restricted syntax may result in a variety of alternative expressions that assist users in better stating their needs.

Consistent with various embodiments, client application 208 may operate on a variety of devices. Such devices may include, but are not limited to, mobile and handheld devices (e.g., laptops, mobile phones, personal or enterprise digital assistants, and the like), personal computers, servers, or other computer systems that access the services and functionality provided by QA system 212. In some embodiments, client application 208 may include one or more components, such as a mobile client 210. Mobile client 210, acting as an agent of client application 210, may dispatch user query requests to QA system 212.

Consistent with various embodiments, client application 208 may also include a search application 202, either as part of mobile client 210 or separately, that may perform several functions, including some or all of the above functions of mobile client 210 listed above. For example, in some embodiments, search application 202 may dispatch requests for information to QA system 212. In some embodiments, search application 202 may be a client application to QA system 212. Search application 202 may send requests for answers to QA system 212. Search application 202 may be installed on a personal computer, a server, or other computer system.

In some embodiments, search application 202 may include a search graphical user interface (GUI) 204 and session manager 206. In such situations, users may be able to enter questions in search GUI 204. In some embodiments, search GUI 204 may be a search box or other GUI component, the content of which can represent a question to be submitted to QA system 212. Users may authenticate to QA system 212 via session manager 206. In some embodiments, session manager 206 may keep track of user activity across sessions of interaction with the QA system 212. Session manager 206 may also keep track of what questions are submitted within the lifecycle of a session of a user. For example, session manager 206 may retain a succession of questions posed by a user during a session. In some embodiments, answers produced by QA system 212 in response to questions posed throughout the course of a user session may also be retained. Information for sessions managed by session manager 206 may be shared between computer systems and devices.

In some embodiments, client applications 208 and QA system 212 may be communicatively coupled through network 215, e.g., the Internet, intranet, or other public or private computer network. In some embodiments, QA system 212 and client application 208 may communicate by using Hypertext Transfer Protocol (HTTP) or Representational State Transfer (REST) calls. In some embodiments, QA system 212 may reside on a server node. Client application 208 may establish server-client communication with QA system 212 or vice versa. In some embodiments, the network 215 can be implemented within a cloud computing environment, or using one or more cloud computing services.

Consistent with various embodiments, QA system 212 may respond to the requests for information sent by client applications 208 (e.g., questions posed by users). QA system 212 may generate answers to the received questions. In some embodiments, QA system 212 may include a question analyzer 214, data sources 224, and answer generator 228. Question analyzer 214 may be a computer module that analyzes the received questions. Question analyzer 214 may perform various methods and techniques for analyzing the questions syntactically and semantically. In some embodiments, question analyzer 214 can parse received questions. Question analyzer 214 may include various modules to perform analyses of received questions. For example, computer modules that question analyzer 214 may encompass include, but are not limited to, a tokenizer 216, part-of-speech (POS) tagger 218, semantic relationship identifier 220, and syntactic relationship identifier 222.

Consistent with various embodiments, tokenizer 216 may be a computer module that performs lexical analysis. Tokenizer 216 can convert a sequence of characters into a sequence of tokens. A token may be a string of characters typed by a user and categorized as a meaningful symbol. Further, in some embodiments, tokenizer 316 can identify word boundaries in an input question and break the question or any text into its component parts such as words, multi-word tokens, numbers, and punctuation marks. In some embodiments, tokenizer 216 can receive a string of characters, identify the lexemes in the string, and categorize them into tokens.

Consistent with various embodiments, POS tagger 218 may be a computer module that marks up a word in a text to correspond to a particular part of speech. POS tagger 218 can read a question or other text in natural language and assign a part of speech to each word or other token. POS tagger 218 can determine the part of speech to which a word corresponds based on the definition of the word and the context of the word. The context of a word may be based on its relationship with adjacent and related words in a phrase, sentence, question, or paragraph. In some embodiments, the context of a word may be dependent on one or more previously posed questions. Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, POS tagger 218 may tag or otherwise annotate tokens of a question with part of speech categories. In some embodiments, POS tagger 218 may tag tokens or words of a question to be parsed by QA system 212.

Consistent with various embodiments, semantic relationship identifier 220 may be a computer module that can identify semantic relationships of recognized entities (e.g., words, phrases, etc.) in questions posed by users. In some embodiments, semantic relationship identifier 220 may determine functional dependencies between entities and other semantic relationships.

Consistent with various embodiments, syntactic relationship identifier 222 may be a computer module that can identify syntactic relationships in a question composed of tokens posed by users to QA system 212. Syntactic relationship identifier 222 can determine the grammatical structure of sentences, for example, which groups of words are associated as "phrases" and which word is the subject or object of a verb. Syntactic relationship identifier 222 may conform to formal grammar.

In some embodiments, question analyzer 214 may be a computer module that can parse a received user query and generate a corresponding data structure of the user query. For example, in response to receiving a question at QA system 212, question analyzer 214 may output the parsed question as a data structure. In some embodiments, the parsed question may be represented in the form of a parse tree or other graph structure. To generate the parsed question, question analyzer 214 may trigger computer modules 216-222. Additionally, in some embodiments, question analyzer 214 may use external computer systems for dedicated tasks that are part of the question parsing process.

Consistent with various embodiments, the output of question analyzer 214 may be used by QA system 212 to perform a search of one or more data sources 224 to retrieve information to answer a question posed by a user. In some embodiments, data sources 224 may include data warehouses, information corpora, data models, and document repositories. In some embodiments, the data source 224 may include an information corpus 226. The information corpus 226 may enable data storage and retrieval. In some embodiments, the information corpus 226 may be a storage mechanism that houses a standardized, consistent, clean and integrated form of data. The data may be sourced from various operational systems. Data stored in the information corpus 226 may be structured in a way to specifically address reporting and analytic requirements. In some embodiments, the information corpus may be a relational database. In some example embodiments, data sources 224 may include one or more document repositories.

In some embodiments, answer generator 228 may be a computer module that generates answers to posed questions. Examples of answers generated by answer generator 228 may include, but are not limited to, answers in the form of natural language sentences; reports, charts, or other analytic representation; raw data; web pages; and the like.

Consistent with various embodiments, answer generator 228 may include query processor 230, visualization processor 232, and feedback handler 234. When information in a data source 224 matching a parsed question is located, a technical query associated with the pattern can be executed by query processor 230. Based on data retrieved by a technical query executed by query processor 230, visualization processor 232 may be able to render visualization of the retrieved data, where the visualization represents the answer. In some embodiments, visualization processor 232 may render various analytics to represent the answer including, but not limited to, images, charts, tables, dashboards, maps, and the like. In some embodiments, visualization processor 232 may present the answer to the user.

In some embodiments, feedback handler 234 may be a computer module that processes feedback from users on answers generated by answer generator 228. In some embodiments, users may be engaged in dialog with the QA system 212 to evaluate the relevance of received answers. Answer generator 228 may produce a list of answers (e.g., candidate answers) corresponding to a question submitted by a user. The user may rank each answer according to its relevance to the question. In some embodiments, the feedback of users on generated answers may be used for future question answering sessions.

The various components of the exemplary question answering system described above may be used to implement various aspects of the present disclosure. For example, the client application 208 could be used to receive an input question from a user. The question analyzer 214 could, in some embodiments, be used to analyze the input question to determine to which question category the input question should be assigned. Further, the query processor 230 or the answer generator 228 could, in some embodiments, be used to determine a set of candidate answers and calculate confidence scores for the candidate answers.

Figure 3:
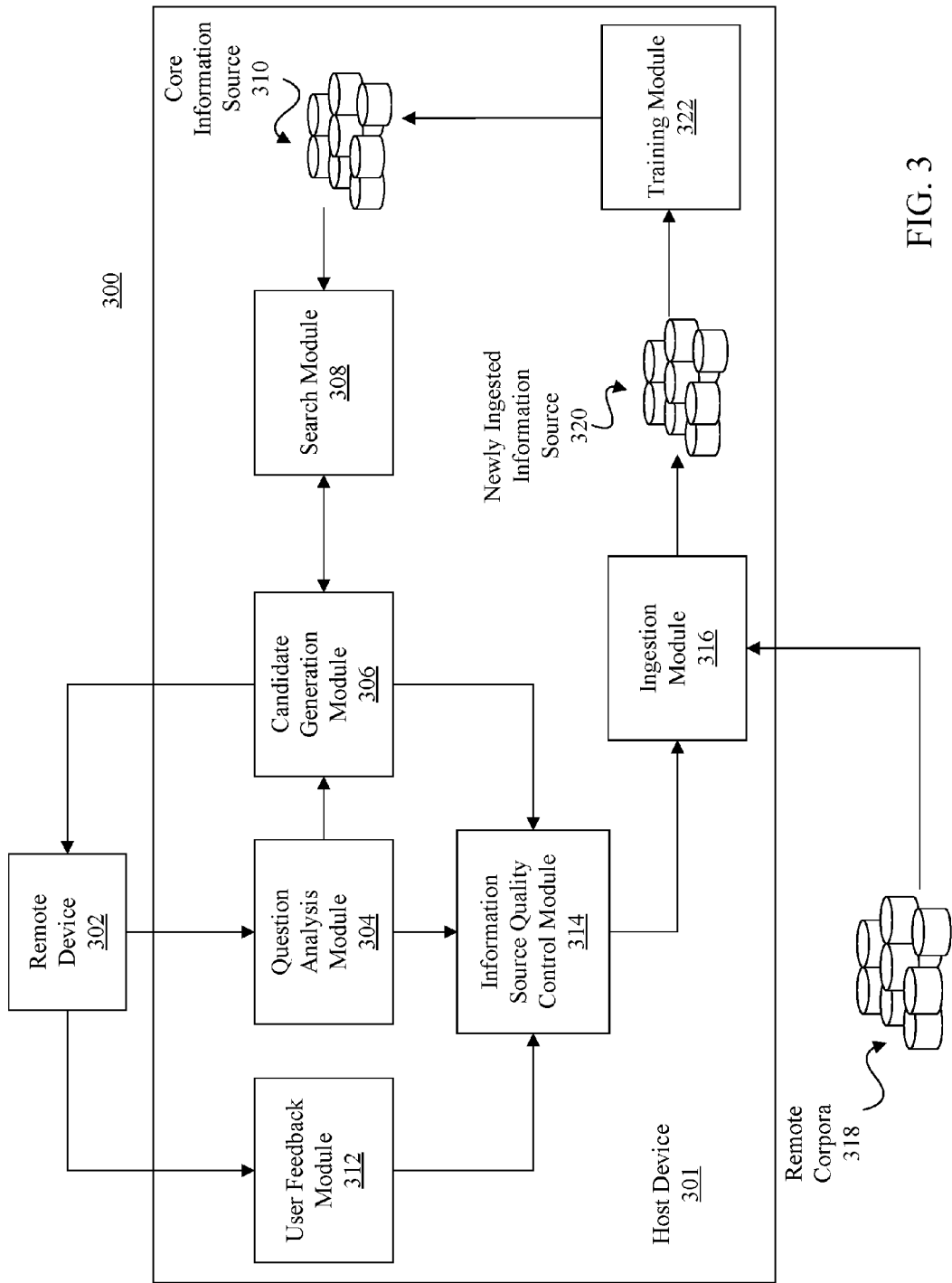
FIG. 3 illustrates a block diagram of an example high level logical architecture of a QA system, consistent with embodiments the present disclosure.

FIG. 3 illustrates a block diagram of an example high level logical architecture of a QA system, consistent with embodiments of the present disclosure. Aspects of FIG. 3 are directed toward components and modules for use with a QA system 300. In some embodiments, host device 301 and remote device 302 may be embodied by host device 122 and remote device 102 of FIG. 1, respectively. In some embodiments, the question analysis module 304, located on host device 301, may receive a natural language question (e.g., an input question) from a remote device 302, and can analyze the question to produce information about the question based on the question's content and context. This may be accomplished, for example, by using components 216-222 of FIG. 2. The information produced by question analysis module 304 may include, for example, the semantic type of the expected answer. In addition the question analysis module 304 may assign a question category to the input question and provide this information to the information source quality control module 314. As used herein question categories may refer to any suitable groupings of input questions wherein a determination as to the appropriate category for a given question is made at least in part based on an analysis of the content of the question itself. In some embodiments, a single given question may be included in multiple question categories.

Next, the candidate generation module 306 may formulate queries from the output of the question analysis module 304 and then pass these queries on to search module 308 which may consult various resources such as the internet or one or more knowledge resources, e.g., databases or corpora, to retrieve documents that are relevant to answering the user question. As used herein, documents may refer to various types of written, printed, or electronic matter (including passages, web-pages, database tuples, etc.) that provide information or evidence. As shown in FIG. 3, the search module 308 may consult core information source 310. As used herein, a core information source may refer to any document or group of documents that is used by a relevant QA system to identify candidate answers to user questions. The candidate generation module 306 may extract, from the search results obtained by search module 308, potential (candidate) answers to the question, which it may then score (e.g., with confidence scores) and rank. A final set of candidate answers, based on a comparison of various confidence scores associated with the candidate answers, may then be sent from the candidate generation module 306 to remote device 302 for presentation to the user. In addition, this information about candidate answers and confidence scores may also be sent to information source quality control module 314. A user may respond, via remote device 302, to the candidate answers (for example, by indicating that none of the provided candidate answers are accurate or relevant) through user feedback module 312. The user feedback module 312 may then provide this feedback to the information source quality control module 314.

In some embodiments, the information source quality control module 314 may compile and analyze information that it receives during the course of normal operations of question and answering system 300. This received information (e.g., information from question analysis module 304, candidate generation module 306, and user feedback module 312) may be usable by the information source quality control module 314 to determine whether one or more new information sources should be ingested. When the information source quality control module 314 determines that a new information source having certain characteristics is needed (e.g., an information source that is associated with a specific question category), it may instruct an ingestion module 316 accordingly. Based on these instructions, ingestion module 316 may search one or more remote sources, such as remote corpora 318, in an attempt to locate one or more suitable new information sources. In some embodiments, once discovered, these new information sources may be ingested by ingestion module 316 and become newly ingested information source 320. This information source may in turn be analyzed by training module 322. This training analysis may take the form of obtaining training candidate answers to training questions using the newly ingested information source 320 and then reviewing the quality of these training answers. As used herein, training questions may refer to predetermined questions that are used by a QA system for either (1) reviewing or determining the quality or characteristics of an information source used to identify training candidate answers to these questions, (2) creating or refining machine learning models and routing paths usable by the QA system, or both. In some embodiments, once a threshold level of confidence in the new information source is met, it may be combined with core information source 310 and used to answer new input questions as they are received from users.

The various components and modules of the exemplary high level logical architecture for a QA system described above may be used to implement various aspects of the present disclosure. For example, the question analysis module 304 may, in some embodiments, be used to obtain input questions and assign these input questions to appropriate question categories. Further, the candidate generation module 306 and search module 308 may together, in some embodiments, be used to perform searches of core information source 310, generate candidate answers, calculate confidence scores associated with these candidate answer, and provide these candidate answers to one or more users. Further, the information source quality control module 314 may, in some embodiments, be used to analyze confidence scores and determine whether the confidence scores fail to meet one or more confidence criteria. Further, ingestion module 316 may, in some embodiments, be used to ingest new information sources (in response to an indication from the information source quality control module 314 that a confidence criteria has not been satisfied).

Figure 4:
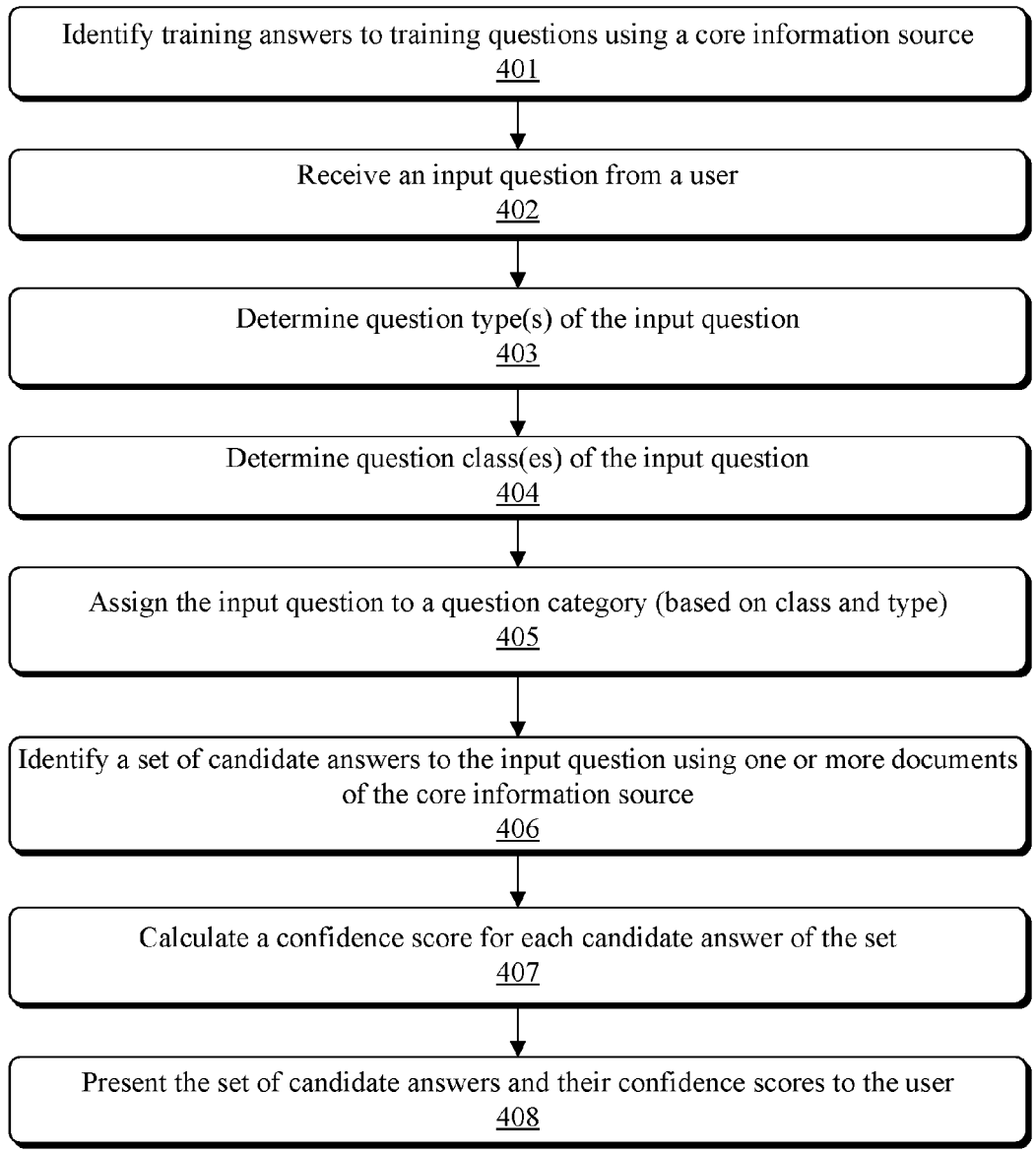
FIG. 4 illustrates a flowchart of an example method for regular answer generation using a QA system, consistent with embodiments of the present disclosure.

Turning to FIG. 4, shown is a flowchart illustrating an example method 400 for regular answer generation using a QA system, according to embodiments of the present invention. The method 400 may begin at block 401 where a core information source may be used to identify training answers to training questions. In some embodiments, this training may occur before the core information source is used for the first time to identify answers to user questions, or it may occur regularly at periodic intervals. Additionally, training may occur when one or more triggering events occur (e.g., when a new updated information source is added to the core information source).

Next, per block 402, an input question may be received by the QA system. The input question may have originated with a user, for example, through the query module 110 of remote device 102 of FIG. 1. The input question may be a set of words. The set of words may or may not form a sentence. The set of words may or may not include punctuation. The set of words may or may not be spelled correctly. In some embodiments, the input question may include audio, video, or still images. The information received by the QA system may include a set of data or a packet arriving at the QA system. It is contemplated that, in some embodiments, input questions may not always be received from human users and instead may be generated by computer systems or components of computer systems. An example input question could be, "When is the best time to visit Detroit?" or "songs about flowers".

At block 403, the system may determine one or more question types for the input question. To make this determination, the QA system may rely on an analysis of the input question. This analysis may be performed, for example, by question analysis module 304 of FIG. 3, which may include question analyzer 214 of FIG. 2. The question analyzer 214 may use one or more components (e.g., components 216-222) that may be able to analyze one or more aspects of the content or context of a user question in order to determine its type. As used herein a type of a given question may refer to a feature or a set or cluster of features that are relevant to the question but which do not require for their determination analysis of the technical subject matter of the question. These features may include, for example, lexical answer type (i.e., the word or phrase in an input question that specifies what kind of entity is being asked about) or linguistic features (e.g., semantic or syntactic relationships between entities in the question, parts of speech featured in words or phrases in the question, etc.). For an example input question of "Why are fish so slippery?" the QA system may group the question into a "why" question type or a "fish" lexical answer question type.

At block 404, the system may determine one or more question classes for the input question. This determination may be made in much the same manner as the determination of question type and may rely on many of the same components for analysis. As used herein a class of a given question may refer to the key technical subject matter or subject area of the question. For example, a question class for the question "What is the average size for a human head?" may be "humans" or "anatomy", or both.

At block 405, the system may assign the input question to a question category. As used herein, a question category may refer to a manner of grouping questions based one or more commonalities in their content. In some embodiments, this assignment of the input question to a question category may be determined based on a number of factors (e.g., question type, question class, etc.); in other embodiments, the assignment may be strictly based on only one factor of interest. Further, in some embodiments, there may be relatively few question categories to which input questions are assigned (e.g., where there are only two possible question categories); in other embodiments, there may be dozens or even hundreds or more question categories and these question categories may be further divided into sub-categories. The number and identity of possible question categories may be determined based on the use to which a particular QA system is put or the goal of the categorization. For example, a veterinarian using a QA system might want to compare how well the QA system answers questions about different kinds of animals that he commonly treats in his practice; accordingly, he may instruct the QA system to only assign input questions to one of four categories: dogs, cats, birds, and other. In another situation, a set of potential categories might include, for example, animals, vegetables, and minerals. Further, an example input question of "What is the average mass of a star?" might be categorized into one or more of an "astrophysics" category, a "star" category, or a "mathematics" category.

At block 406, the QA system may identify a set of (i.e., one or more) candidate answers to the input question using one or more documents of the core information source. In this context, in some embodiments, identifying may refer to initially generating a candidate answer using one or more source documents; to supporting (using the one or more source documents) a candidate answer that was previously generated; or both. Furthermore, in some embodiments, some potential candidate answers may be identified or generated, but later rejected or modified without becoming part of the set of candidate answers. For example, in response to one input question, dozens of potential candidate answers may be identified, but only a few may eventually form the set of candidate answers presented to the user.

In some embodiments, this step of identifying can be performed, for example, by either search module 308 or candidate generation module 306 of FIG. 3 (or both), after having relied on an output of the question analysis module 304, also of FIG. 3, in order to perform a search of the core information source 310. In some embodiments, a given document may support more than one candidate answer and a candidate answer may be supported by one or more documents. For example, applying the step of block 406 to the example question, "Where was Shakespeare born?" may result in the identification of a first candidate answer of "Stratford-upon-Avon", which may have as a supporting document a particular book on English history.

At block 407, a confidence score may be calculated for each candidate answer of the set of candidate answers. As used herein, a confidence score may ultimately relate to a level of confidence in the correctness of a particular candidate answer to a particular input question. Confidence scores may be used or provided in many forms, including, for example, as numbers, ranges of numbers, or other concepts indicative of a level of confidence (e.g., "high" confidence). In some embodiments, confidence subscores may be used, and they may be combined to generate the total confidence score for a given candidate answer. In some embodiments, a separate confidence subscore may be calculated for each document supporting a particular answer. For example, a candidate answer with one supporting document may have one confidence subscore, while another candidate answer having three supporting documents may have three confidence subscores. These three confidence subscores may be combined (e.g., added or averaged). In some embodiments, each confidence score may indicate a level of confidence in a given candidate answer based on a number of factors and each factor may be given its own type of confidence subscore. These factors may include, for example, the trustworthiness of a supporting document's source, the content of a supporting document, the content of a candidate answer, the similarity of context of a supporting document with the context of an applicable user question, etc. It is contemplated that factors may be weighted differently and that not all factors may be applicable to every candidate answer. In some embodiments, a confidence rule may be used to determine confidence scores or subscores. As used herein, a confidence rule may refer to a rule (e.g., an algorithm, a set of algorithms, or a set of other procedures) that may rely on inputting values for variables, in order to output a score that may be indicative of, among potentially other things, the value of a given support document in the context of supporting a given candidate answer to a given input question. As a simplified example, for the answer "London" to the input question "What is the capital of England?", an atlas might be used to support the answer and, in relation to using the atlas, a relatively high confidence subscore of 9 out of 10 may be calculated because of the trustworthiness of the publisher of the atlas and the close similarity in context between the atlas and the input question (i.e., both relate to geography).

At block 408, the set of candidate answers and their associated confidence scores may be presented to the user, for example, via a user interface of remote device 302 of FIG. 3. In some embodiments, this presentation may take the form of a graphical user interface with the top three answers displayed with their associated confidence scores. As discussed previously, not all potential candidate answers may be presented to the user, and the final set of candidate answers may be selected based on having the highest confidence scores of all of the potential candidate answers. In some embodiments, the set of candidate answers may include only a single, best candidate answer.

Figure 5:
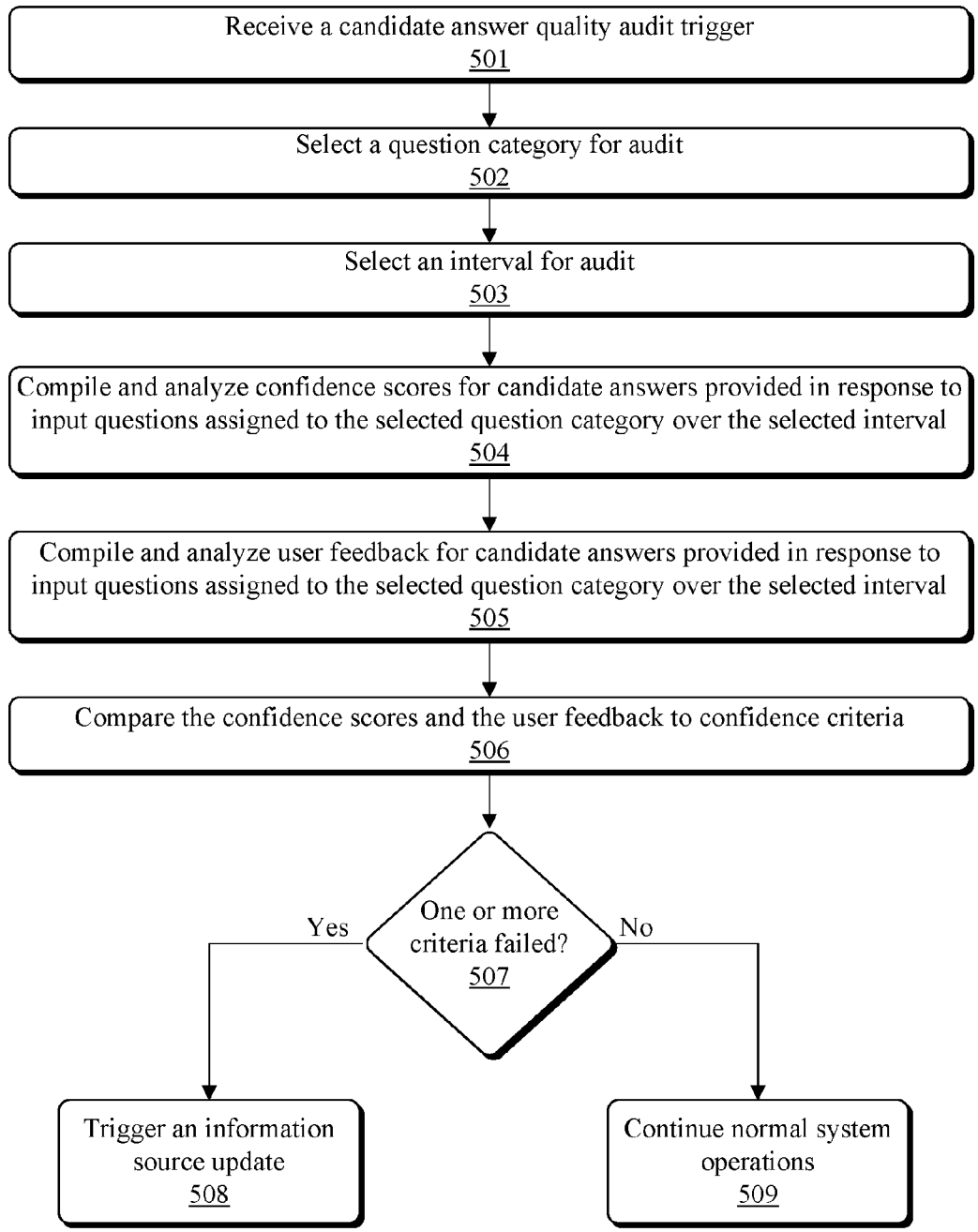
FIG. 5 illustrates a flowchart of an example method for using a QA system to perform a candidate answer quality control audit in order to determine whether an updated information source should be ingested, consistent with embodiments of the present disclosure.

Turning to FIG. 5, shown is a flowchart illustrating an example method 500 for using a QA system to perform a candidate answer quality control audit in order to determine whether a new information source should be ingested, according to embodiments of the present invention. In some embodiments, method 500 may performed, for example, by the information source quality control module 314 of FIG. 3. The method 500 may begin at block 501, where an audit trigger is received. The audit trigger may be generated in response to a number of possible causes. In some embodiments, audits may be triggered at periodic or irregular intervals. Audits may also be triggered every time one or more particular circumstances occurs (e.g., a set of candidate answers has low scores, negative user feedback is received, etc.). Or audits may be triggered based on more complicated sets of circumstances (e.g., receiving negative user feedback on three or more of the last five sets of candidate answers). In some embodiments, audits may be triggered based on poor quality answer sets for questions within a particular question category. Further, in some embodiments, audits may not be triggered by any particular factors per se, but instead they may be continuously occurring as the QA system operates.

Per block 502, the QA system may select a question category for audit (e.g., quality control review). This selection may be made randomly or based on some preset formula (e.g., cycling through the question categories and auditing one question category every time an audit is triggered). The selection may also be made based on the nature of the trigger; for example, if negative user feedback is received based on a set of candidate answers to an input question in the culinary question category, then the culinary question category may be the question category selected for audit.

Per block 503, the QA system may then select an interval for audit. The interval selected may be based on any designated unit (e.g., number of input questions, time, etc.) and may be for any desired length (e.g., last fifteen input questions, last ten days, over the month of June, etc.). The selected interval may include all questions assigned to the selected question category (i.e., an unlimited interval).

Per block 504, the QA system may then compile and analyze confidence scores for candidate answers provided in response to input questions assigned to the selected question category over the selected interval. Similarly, per block 505, the QA system may also compile and analyze any user feedback for this same set of candidate users. It is contemplated that not all such candidate answers may include user feedback. In some embodiments, the analyses of blocks 504 and 505 may include searches for trends or anomalies among the complied data. Per block 506, based on the analysis performed in blocks 504 and 505, the confidence scores and user feedback may be compared to confidence criteria. As used herein confidence criteria may refer to criteria that relate to whether or how well candidate answers fit with questions to which they respond. In some embodiments, confidence criteria may include measures of accuracy, completeness, or relevance. Confidence criteria may be criteria for single candidate answers, sets of candidate answers, or groupings of candidate answer sets. Further, in some embodiments, confidence criteria may be quantitative rather than qualitative requirements. Examples of confidence criteria may include: having confidence scores be below a particular threshold for no more than ten out of the last fifty candidate answers; receiving positive user feedback on at least five of the last one hundred candidate answers; or providing a correct candidate answer to all of the last three input questions.

Per decision block 507, a determination may be made as to whether one or more of the applicable confidence criteria have not been satisfied for the analyzed confidence scores and/or analyzed user feedback. If one or more confidence criteria have not been satisfied, then, per block 508, an information source update may be triggered. In some embodiments, the triggered update may take the form of updated information source ingestion and training method 600 of FIG. 6, as discussed in detail below. However, if all confidence criteria are satisfied, then, per block 509, normal operations of the QA system may be continued (e.g., input questions may continue to be ingested and candidate answers may continue to be identified without any updates or significant modifications to the core information source).

It is contemplated that in some embodiments, method 500 may be repeated for reviewing multiple question categories and for obtaining useful information about the strengths and weaknesses of a given QA system. Furthermore, by using method 500 a user may obtain valuable insight (e.g., via a graphical user interface) about the given QA system. For example, by using method 500 the user may learn that the current core information source for the QA system is adequate for identifying candidate answers to questions assigned to an economics question category, but, on the other hand, the QA system needs to ingest an updated information source in order to be reliably usable for identifying candidate answers to questions assigned to a weather question category.

There are many different potential situations where method 500 of FIG. 5 could be useful. An example is provided herein using a medical context. In this example, an infectious disease specialist may regularly use his hospital's QA system to help him diagnose the diseases afflicting his patients. On one particular occasion, the specialist may ask the QA system an input question about a diagnosis on a difficult case with a particular patient. A set of three candidate answers (i.e., three different potential diagnoses based on the patient's symptoms) may be identified using the QA system's core information source and provided to the specialist. The specialist may provide feedback indicating that all three candidate answers are inaccurate.

Based on the designated settings for the hospital's QA system, this negative feedback may cause the system to receive a candidate answer quality control audit trigger (per block 501 of FIG. 5). Upon receipt of the trigger, the system (either at the direction of the specialist or automatically) may review the question categories that it maintains and select the question category of "infectious disease (diagnosis only)" for audit (per block 502). Similarly, the system (once again, at the direction of the specialist or automatically) may select as the interval for audit (per block 503) the last ninety input questions assigned to the question category of "infectious disease (diagnosis only)".

Based on the question category and interval selected for audit, the hospital's QA system may compile and analyze confidence scores (per 504) for the last 270 potential infectious disease diagnoses that it has provided to doctors (assuming three candidate answers were provided for each of the ninety designated input questions). Likewise, the system may also compile and analyze user feedback (per 505), if any, provided for each of these last 270 potential infectious disease diagnoses. In the alternative, the confidence scores and user feedback for only ninety potential diagnoses may be analyzed. This may occur, for example, where the system's settings designate that only the confidence scores and user feedback for candidate answers that are the best of their respective sets should be analyzed (i.e., where only the top answer to each input question is analyzed).

Next, the hospital's QA system may compare the compiled and analyzed confidence scores and user feedback to confidence criteria (per 506). To continue this example, a combined analysis may reveal, among other things, that forty percent of the analyzed confidence scores are deemed "below average" and twenty percent of the analyzed user feedback is negative. These results may (per 507) fail to satisfy one of the QA system's criterion (e.g., a criterion that requires that no more than thirty percent of analyzed confidence scores may be in the "below average" category in instances where less than five hundred confidence scores are analyzed). As result of the failure, the hospital's QA system may be prompted (per 508) to ingest an updated information source (e.g., a new medical diagnosis database). In the alternative, the results of the analysis may (per 507) satisfy all of the QA system's criteria, and, rather than ingesting a new information source, the hospital's QA system may continue normal operation (per 509). This is just one example of many possible uses of method 500 of FIG. 5.

Figure 6:
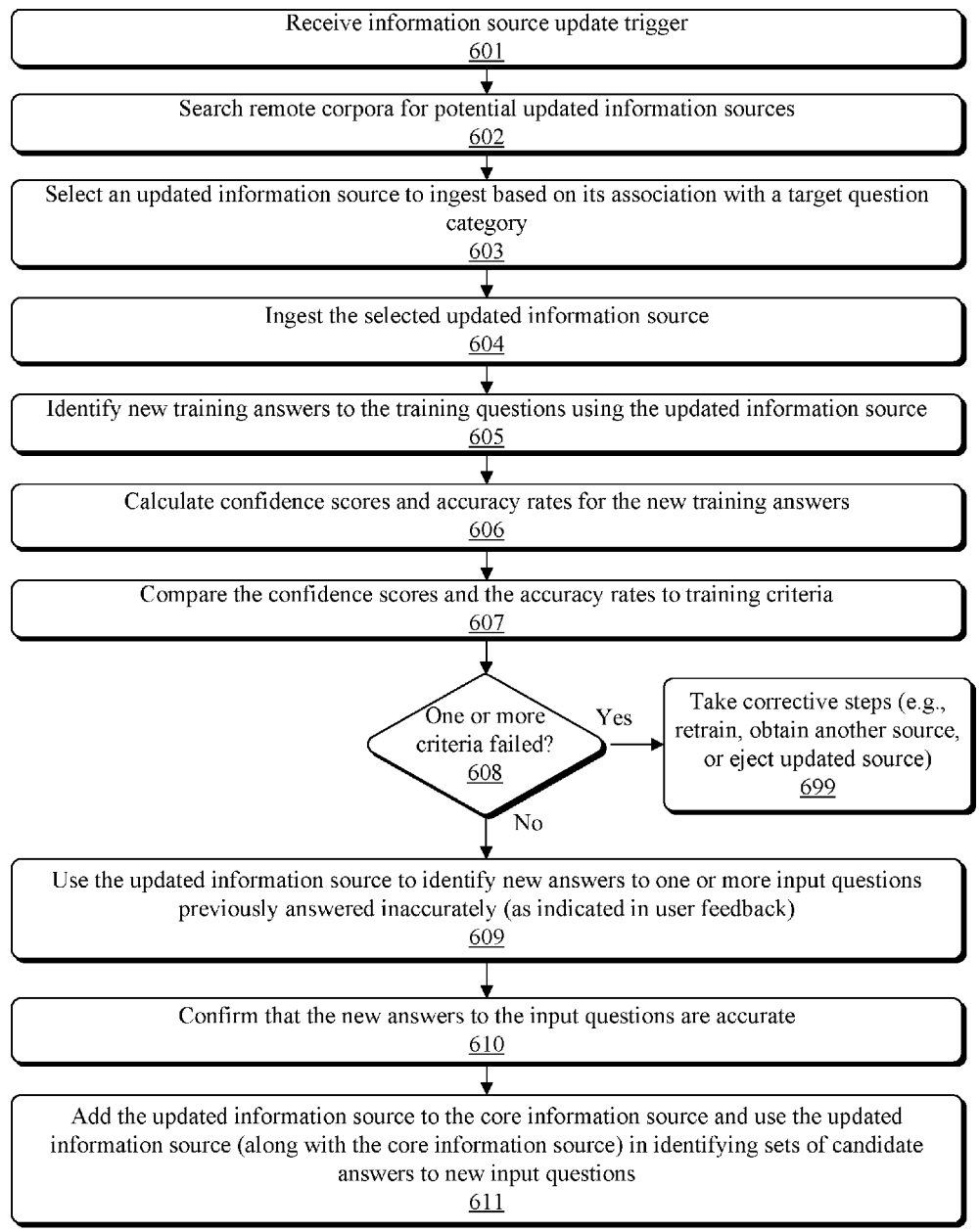
FIG. 6 illustrates a flowchart of an example method for ingesting an updated information source into a QA system and training the QA system using the updated information source, consistent with embodiments of the present disclosure.

Turning to FIG. 6, shown is a flowchart of an example method 600 for ingesting an updated information source into a QA system and training the QA system using the updated information source. As used herein, an updated information source may refer to any information source incorporating documents not previously ingested by a particular QA system or used by the QA system to identify candidate answers to input questions. Method 600 begins at block 601, where an information source update trigger may be received, for example, by ingestion module 316 of FIG. 3. In some embodiments, ingestion of an updated information source may be triggered based on poor quality answer sets for questions within a particular question category, which results in confidence scores that fail to satisfy one or more confidence criteria. An ingestion may occur automatically upon the failure to satisfy a confidence criterion; or, in the alternative, the criterion failure may result in a notification to the user that an ingestion should occur, and the user may make the final decision as to whether (and under what circumstances) an updated information source should be sought out for ingestion.

Per block 602, the QA system may search one or more remote corpora for potential updated information sources for ingestion. Per block 603, the QA system may select a particular updated information source for ingestion. This selection may be made based on a number of factors, which may, in some embodiments, include an association between a target question category (i.e., the question category that created the need for obtaining a new information source) and a particular updated information source. For example, if a culinary question category triggered the search for a new information source, then a newly published recipe book may be more likely to be selected for ingestion. Per block 604, the selected updated information source may be ingested by the QA system. The documents of the updated information source may be structured or unstructured data. In some embodiments, hundreds, thousands, or millions or more of documents can be ingested by the system as part of one new information source ingestion and these documents may be ingested at substantially the same time (i.e., during a single ingestion cycle) or may be ingested at different times.

The remaining portion of method 600 may be centered around training on the newly ingested information source. Per block 605, the updated information source may be used to identify new training answers to training questions. All or some of the training questions may be the same training questions that may have previously been used to train the QA system on the core information source and/or one or more other previously ingested information sources that may have been added to the core information source. Per block 606, confidence scores and accuracy rates (e.g., percentages of answers that are correct) for the new training answers may be calculated. Next, per block 607, the calculated confidence scores and accuracy rates may be compared to a set of training criteria. As used herein training criteria may refer to any suitable criteria that must be satisfied before a particular information source may be used to identify candidate answers to new input questions. In some embodiments, training criteria may include confidence criteria. In addition, training criteria may include other criteria relating to whether a new information source is worth adding to the core information source. For example, the training criteria may require that a new information source tends to be useful for identifying more accurate (or at least significantly different) candidate answers to questions within a particular question category than those candidate answers to the same questions that are identified using the core information source.

Per decision block 608, a determination may be made as to whether one or more of the applicable training criteria have not been satisfied for the calculated confidence scores and/or accuracy rates. If one or more training criteria have not been satisfied, then, per block 699, corrective actions may be taken by the QA system. Such actions may include retraining the QA system on the same updated information source, obtaining another updated information source, and/or ejecting the updated information source (i.e., getting rid of it). However, if all training confidence criteria are satisfied, then, per block 609, the updated information source may be used to identify new answers to one or more input questions previously answered inaccurately (as indicated by user feedback). This step may serve as a test of whether the updated information source is of good quality or relevant to the user's purpose. The input questions selected for new answers may include the input questions that ultimately triggered the ingestion of the updated information source. Per block 610, the QA system may confirm that the new answers to the input questions are accurate. Finally, per block 611, the updated information source, having been fully vetted, may then be added to the core information source and used (along with the core information source) in identifying sets of candidate answers to new input questions as they are received by the QA system.

In some embodiments, as new documents or new corpora of the updated information source are added to the core information source, old documents may be deleted, or corpora may be combined or divided to promote searching efficiency. Furthermore, it is contemplated that in some embodiments, a QA system may continue to be operational during the ingestion of and training with updated information sources. This may occur, for example, where the QA system continues to identify candidate answers to input questions using the core information source while method 600 is occurring.

As discussed in more detail below, it is contemplated that some or all of the steps of some of the embodiments of methods described herein may be performed in alternative orders or may not be performed at all; furthermore, multiple steps may occur at the same time or as an internal part of a larger process. For example, per blocks 403-405 of method 400 of FIG. 4, a question class and a question type of an input question may, in some embodiments, be determined as part of the process of assigning the input question to a question category, rather than as separate steps having their own distinct outputs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for handling a plurality of input questions, the system comprising:
    a computer configured to:
        prior to receiving the plurality of input questions, identify a first set of training candidate answers to each training question of a plurality of training questions using a core information source;
        receive the plurality of input questions;
        assign each question of the plurality of input questions to a first question category of a plurality of question categories;
        identify a set of candidate answers to each input question of the plurality of input questions using the core information source;
        calculate a first set of confidence scores, the first set of confidence scores including a confidence score for each candidate answer of each set of candidate answers;
        provide the set of candidate answers to a user;
        receive feedback from the user, the feedback including an indication that none of a set of candidate answers to a first input question of the plurality of input questions is accurate, and the feedback further including a correct answer to the first input question;
        in response to determining that the first set of confidence scores fails to satisfy confidence criteria, ingest an updated information source that is separate from the feedback;
        in response to the receiving the feedback, identify a new answer to the first input question using the updated information source;
        compare the new answer identified using the updated information source to the correct answer included in the feedback;
        determine, based on the comparing the new answer to the correct answer, that the new answer and the correct answer are not the same; and
        in response to determining that the new answer and the correct answer are not the same, elect the updated information source without adding the updated information source to the core information source.

2. The system of claim 1, wherein the computer is further configured to:
    prior to the ingesting the updated information source, determine that the updated information source has an association with the first question category; and
    select the updated information source for ingestion based on at least the association between the updated information source and the first question category.

3. The system of claim 1, wherein the computer is further configured to:
    receive a second plurality of input questions;
    assign the second plurality of input questions to a second question category of the plurality of question categories;
    identify a set of candidate answers to each input question of the second plurality of input questions using the core information source;

calculate a second set of confidence scores, the second set of confidence scores including a confidence score for each candidate answer of each set of candidate answers to each input question of the second plurality of input questions; and determine that the second set of confidence scores satisfies the confidence criteria.

4. The system of claim 1, wherein each question of the plurality of input questions are assigned to the first question category based on at least determining a type and a class for each question and analyzing the type and the class for each question.

5. A computer program product comprising a computer readable storage medium having program instructions embodied therewith, the program instructions executable by a computer to cause the computer to perform a method comprising:

prior to receiving a plurality of input questions, identifying a first set of training candidate answers to each training question of a plurality of training questions using a core information source;

receiving the plurality of input questions;

assigning each question of the plurality of input questions to a first question category of a plurality of question categories;

identifying a set of candidate answers to each input question of the plurality of input questions using the core information source;

calculating a first set of confidence scores, the first set of confidence scores including a confidence score for each candidate answer of each set of candidate answers;

providing the set of candidate answers to a user;

receiving feedback from the user, the feedback including an indication that none of a set of candidate answers to a first input question of the plurality of input questions is accurate, and the feedback further including a correct answer to the first input question;

in response to determining that the first set of confidence scores fails to satisfy confidence criteria, ingesting an updated information source that is separate from the feedback;

in response to the receiving the feedback, identifying a new answer to the first input question using the updated information source;

comparing the new answer identified using the updated information source to the correct answer included in the feedback;

determining, based on the comparing the new answer to the correct answer, that the new answer and the correct answer are not the same; and in response to determining that the new answer and the correct answer are not the same, electing the updated information source without adding the updated information source to the core information source.

* * * * *